US008710819B2

(12) United States Patent
Chen

(10) Patent No.: US 8,710,819 B2
(45) Date of Patent: Apr. 29, 2014

(54) LOW OFFSET, FAST RESPONSE VOLTAGE CONTROLLED CURRENT SOURCE AND CONTROLLING METHOD THEREOF

(75) Inventor: Jun Chen, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 163 days.

(21) Appl. No.: 13/529,079

(22) Filed: Jun. 21, 2012

(65) Prior Publication Data

US 2013/0009621 A1 Jan. 10, 2013

(30) Foreign Application Priority Data

Jul. 7, 2011 (CN) .......................... 2011 1 0190045

(51) Int. Cl.
*H02M 3/156* (2006.01)

(52) U.S. Cl.
USPC .......................................................... 323/285

(58) Field of Classification Search
CPC .............................. H02M 3/156; H02M 3/157
USPC .......................... 323/282, 283, 285, 288, 351
See application file for complete search history.

(56) References Cited

U.S. PATENT DOCUMENTS

| | | | | |
|---|---|---|---|---|
| 6,381,159 | B2 * | 4/2002 | Oknaian et al. | 323/282 |
| 7,019,504 | B2 * | 3/2006 | Pullen et al. | 323/283 |
| 7,710,084 | B1 * | 5/2010 | Guo | 323/283 |
| 7,863,876 | B2 * | 1/2011 | Cook et al. | 323/281 |
| 8,085,005 | B2 * | 12/2011 | Dearn | 323/282 |
| 2008/0130186 | A1 * | 6/2008 | Nagase et al. | 323/282 |
| 2011/0234188 | A1 * | 9/2011 | Chiu et al. | 323/282 |

* cited by examiner

*Primary Examiner* — Gary L Laxton
*Assistant Examiner* — Alex Torres-Rivera
(74) *Attorney, Agent, or Firm* — Michael C. Stephens, Jr.

(57) ABSTRACT

The present invention relates to a low offset and fast response voltage controlled current source, controlling method, and a power supply thereof. In one embodiment, a voltage controlled current source can include: a clock signal generator, a first operational amplifier, an input offset eliminator, a sampling and holding circuit, and an output circuit. The input offset eliminator can receive a clock signal, an input voltage, and a feedback voltage, and can (i) store and then eliminate an input offset of the first operation amplifier, and generate an error signal in accordance with an error between the input and feedback voltages when the clock signal is active, and (ii) generate the error signal in accordance with the stored input offset and the error between the input and feedback voltages when the clock signal is inactive.

15 Claims, 10 Drawing Sheets

LOW OFFSET, FAST RESPONSE VOLTAGE CONTROLLED CURRENT SOURCE AND CONTROLLING METHOD THEREOF

RELATED APPLICATIONS

This application claims the benefit of Chinese Patent Application No. CN201110190045.6, filed on Jul. 7, 2011, which is incorporated herein by reference in its entirety.

FIELD OF THE INVENTION

The present invention relates to a voltage controlled current source, and more particularly to a low offset, fast response voltage controlled current source, controlling method, and a power supply thereof.

BACKGROUND

Voltage controlled current sources have been widely used because of a relatively simplified design and ease of debugging. One implementation includes operational amplifiers, but may have a disadvantage of reduced accuracy because lower offset of the input terminals of the operational amplifier may lead to a larger output error. A conventional method to overcome this problem is to utilize high power MOSFETs or BJTs to form an input differential pair of the operational amplifier, and matched layout to decrease random offsets. However, an input offset of several mV will may exist even though layout is well matched for implementations employing high power MOSFETs. Further, such high power MOSFETs may not be available for some applications, such as light emitting diode (LED) drivers, due to the output error caused by the input offset. In addition, the input offset can be influenced by temperature, illumination, radiation and other effects, possibly reducing voltage controlled current source applications. Also, implementations employing BJTs may have disadvantages related to conventional CMOS process restrictions, larger volume, and influences by temperature and other external factors.

SUMMARY

In one embodiment, a voltage controlled current source configured to drive an output load based on an input voltage, can include: (i) a clock signal generator configured to generate a clock signal based on a square-waveform control signal, where the clock signal includes a square waveform signal with a predetermined duty cycle during an active portion of the control signal, and where the clock signal is in an inactive state during an inactive portion of the control signal; (ii) a first operational amplifier having a first terminal configured to receive the input voltage, and a second terminal configured to receive a feedback voltage of the output load; (iii) an input offset eliminator configured to receive the clock signal, the input voltage, and the feedback voltage, where the input offset eliminator is configured to (a) store and then eliminate an input offset of the first operation amplifier, and to generate an error signal in accordance with an error between the input and feedback voltages when the clock signal is active and to (b) generate the error signal in accordance with the stored input offset and the error between the input and feedback voltages when the clock signal is inactive; (iv) a sampling and holding circuit configured to receive an output signal of the first operational amplifier and the control signal, where energy is stored in accordance with the output signal of the first operational amplifier during the active portion of the control signal, and where the stored energy is maintained by the sampling and holding circuit during the inactive portion of the control signal; and (v) an output circuit coupled to the sampling and holding circuit, the output circuit being configured to drive the output load during the active portion of the control signal.

In one embodiment, a power supply can include: (i) the voltage controlled current source; (ii) a power stage circuit configured to receive an input signal and a PWM control signal, and to generate an output voltage coupled to the voltage controlled current source; and (iii) a controlling circuit configured to generate the PWM control signal in accordance with the feedback signal of the output load. The voltage controlled current source can receive the PWM control signal, eliminate the input offset and generate an output current according to the input voltage and the feedback signal of the output load to drive the output load.

In one embodiment, a controlling method for a voltage controlled current source configured to drive an output load in accordance with an input voltage, can include: (i) receiving a square-waveform control signal; (ii) generating a clock signal based on the control signal, where the clock signal includes a square waveform signal with a predetermined duty cycle during an active portion of the control signal, and where the clock signal is in an inactive state during an inactive portion of the control signal; (iii) when the clock signal is active, storing input offset information and eliminating an input offset of a first operational amplifier by using the input voltage and a feedback voltage of the output load, and generating an error signal according to an error between the input and feedback voltages; (iv) when the clock time is inactive, generating the error signal according to the error between the input and feedback voltages, and storing the input offset information; (v) storing energy in accordance an output signal of the first operational amplifier during the active portion of the control signal; (vi) maintaining the stored energy during the inactive portion of the control signal; (vii) driving the output load in accordance with the stored energy at an initial active moment of the control signal; and (viii) driving the output load in accordance with the output signal during the active portion of the control signal.

Embodiments of the present invention can advantageously provide several advantages over conventional approaches. For example, a voltage controlled current source with low offset and fast response, which overcomes the input offset by use of an auto zero calibrator, and achieves faster response by supplementing a sampling and holding circuit, can improve the slew rate of the operational amplifier. Other advantages of the present invention will become readily apparent from the detailed description of preferred embodiments below.

DETAILED DESCRIPTION

Figure 1:
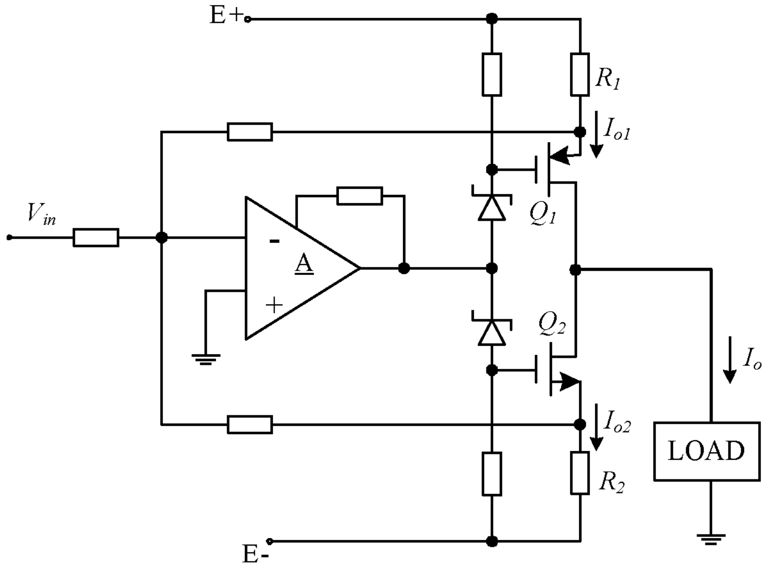
FIG. 1 shows a block diagram of an example voltage controlled current source.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, voltage controlled current sources of particular embodiments can advantageously provide a decrease in input offset voltage, which may be relatively larger compared to the input reference voltage, to a preferred range to decrease associated output error. Also, a problem of limited slew rate of the operational amplifier can be improved to achieve faster response to satisfy more applications. For example, in light emitting diode (LED) drivers, the switching speed can be less than about 1 μs. Also, the input offset may be substantially eliminated by using an automatic zero calibrator. In this way, lower input offset can be achieved by standard CMOS process despite possible influences to the input offset from temperature, time, illumination, and radiation. In addition, the layout match may not need to be strictly executed, thus potentially decreasing both development time and associated costs. The invention, in its various aspects, will be explained in greater detail below with regard to exemplary embodiments.

Referring now to FIG. 1, shown is a schematic diagram of an example voltage controlled current source with an operational amplifier. Here, operational amplifier A can include an input differential pair formed by high power MOSFETs. The common mode voltage of the input terminals may be almost zero by operation of P-type transistor $Q_1$ and N-type transistor $Q_2$ of the feedback loop. Current $I_{o1}$ through -ype transistor $Q_1$ maybe determined by resistor $R_1$, while current $I_{o2}$ through N-type transistor $Q_2$ can be determined by resistor $R_2$. Voltage proportional to the difference between current $I_{o1}$ and current $I_{o2}$ ($I_{o1}-I_{o2}$) can be transferred to the inverting terminal of operational amplifier A. An output current $I_o$ can be generated in accordance with input voltage $V_{in}$. Transistors may be matched (e.g., the same parameter β), and the remaining voltage may be regulated to essentially zero to decrease the offset current of the output terminals. However, in this example implementation, the requirement for layout match may not be substantially decreased, and the offset current of the output terminals can vary with temperature, illumination, and radiation due to the intrinsic MOSFET characteristics.

In one embodiment, a voltage controlled current source configured to drive an output load based on an input voltage, can include: (i) a clock signal generator configured to generate a clock signal based on a square-waveform control signal, where the clock signal includes a square waveform signal with a predetermined duty cycle during an active portion of the control signal, and where the clock signal is in an inactive state during an inactive portion of the control signal; (ii) a first operational amplifier having a first terminal configured to receive the input voltage, and a second terminal configured to receive a feedback voltage of the output load; (iii) an input offset eliminator configured to receive the clock signal, the input voltage, and the feedback voltage, where the input offset eliminator is configured to (a) store and then eliminate an input offset of the first operation amplifier, and to generate an error signal in accordance with an error between the input and feedback voltages when the clock signal is active and to (b) generate the error signal in accordance with the stored input offset and the error between the input and feedback voltages when the clock signal is inactive; (iv) a sampling and holding circuit configured to receive an output signal of the first operational amplifier and the control signal, where energy is stored in accordance with the output signal of the first operational amplifier during the active portion of the control signal, and where the stored energy is maintained by the sampling and holding circuit during the inactive portion of the control signal; and (v) an output circuit coupled to the sampling and holding circuit, the output circuit being configured to drive the output load during the active portion of the control signal.

Figure 2:
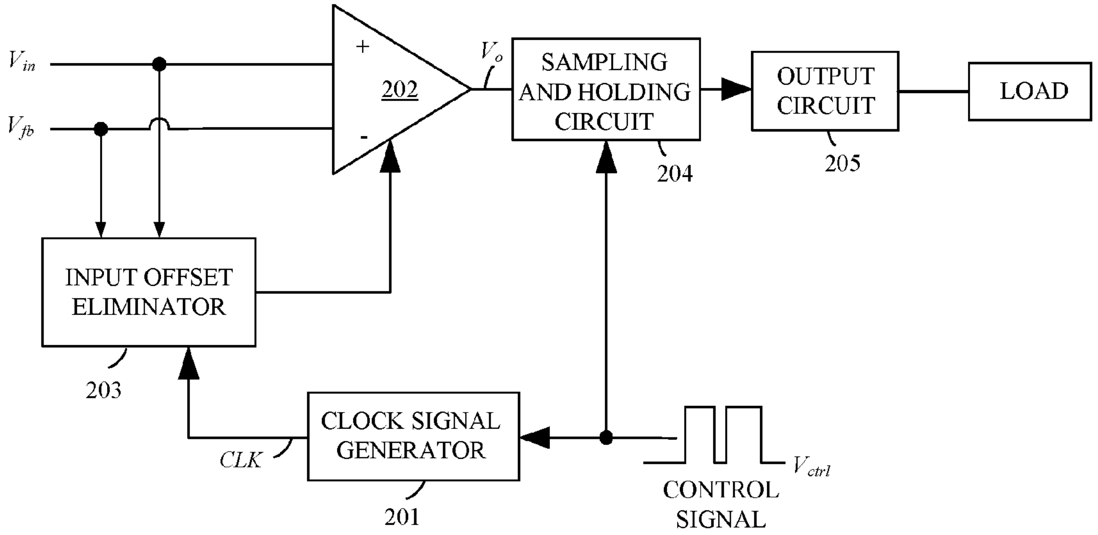
FIG. 2 shows a block diagram of a first example voltage controlled current source in accordance with embodiments of the present invention.

With reference to FIG. 2, a block diagram of a first example voltage controlled current source in accordance with embodiments of the present invention is shown. This example voltage controlled current source can include clock signal generator 201, first operational amplifier 202, input offset eliminator or cancellation circuit 203, sampling and holding circuit 204, and output circuit 205.

Clock signal generator 201 may be configured to generate clock signal CLK in accordance with control signal $V_{ctrl}$, which can be representative of a square waveform with a variable duty cycle. Also, a certain or predetermined sequence may be satisfied between clock signal CLK and the control signal $V_{ctrl}$. Input voltage $V_{in}$ may be received at a non-inverting terminal of first operational amplifier 202, and feedback voltage $V_{fb}$ indicating an output load of the voltage controlled current source may be coupled to the inverting terminal. Input offset cancellation circuit 203 can receive clock signal CLK to eliminate the input offset of first operational amplifier 202.

Sampling and holding circuit 204 can be coupled to first operational amplifier 202 to receive output voltage $V_o$ of first operational amplifier 202 and control signal $V_{ctrl}$. Output circuit 205 can be coupled to sampling and holding circuit 204 to drive the output load during the active portion of the control signal $V_{ctrl}$. During an active portion of the control signal $V_{ctrl}$, clock signal CLK may be a square signal with a fixed duty cycle that turns active consistent with the control signal at the beginning moment of an active portion of the control signal. During the inactive portion of the control signal $V_{ctrl}$, clock signal CLK may be maintained as inactive.

When clock signal CLK is active (e.g., during a first time interval), input offset eliminator 203 can receive input voltage $V_{in}$ and feedback voltage $V_{fb}$ of the output load to eliminate the input offset of first operational amplifier 202. An output of input offset eliminator 203 can be an error signal provided to operational amplifier 202. Also, prior to such elimination, the input offset information may be stored (e.g., in a register of input offset eliminator 203, in a separate storage device or storage circuit, etc.). First operational amplifier 202 may generate output voltage $V_o$ according to an error between input voltage $V_{in}$ and feedback voltage $V_{fb}$ of the output load.

When clock signal CLK is inactive (e.g., during a second time interval), input offset cancellation circuit 203 may be out of operation, first operational amplifier 202 may eliminate the input offset in accordance with the stored input offset information, and also generate an output signal (e.g. $V_o$) according to the error between input voltage and feedback voltage $V_{fb}$ of the output load. At this time, sampling and holding circuit 204 can receive output signal or voltage $V_o$ of first operational amplifier 202, supply power to the output load through output circuit 205, and stores energy (e.g., in a capacitor, rechargeable battery, etc.) with output voltage $V_o$.

During an inactive portion of control signal $V_{ctrl}$, clock signal CLK may be in an inactive state, input offset cancellation circuit 203 may be out of operation, and sampling and holding circuit 204 can maintain the stored energy information. In this way, the load can driven in a relatively fast fashion by output circuit 205 to achieve fast response when control signal $V_{ctrl}$ recovers to active.

Figure 3A:
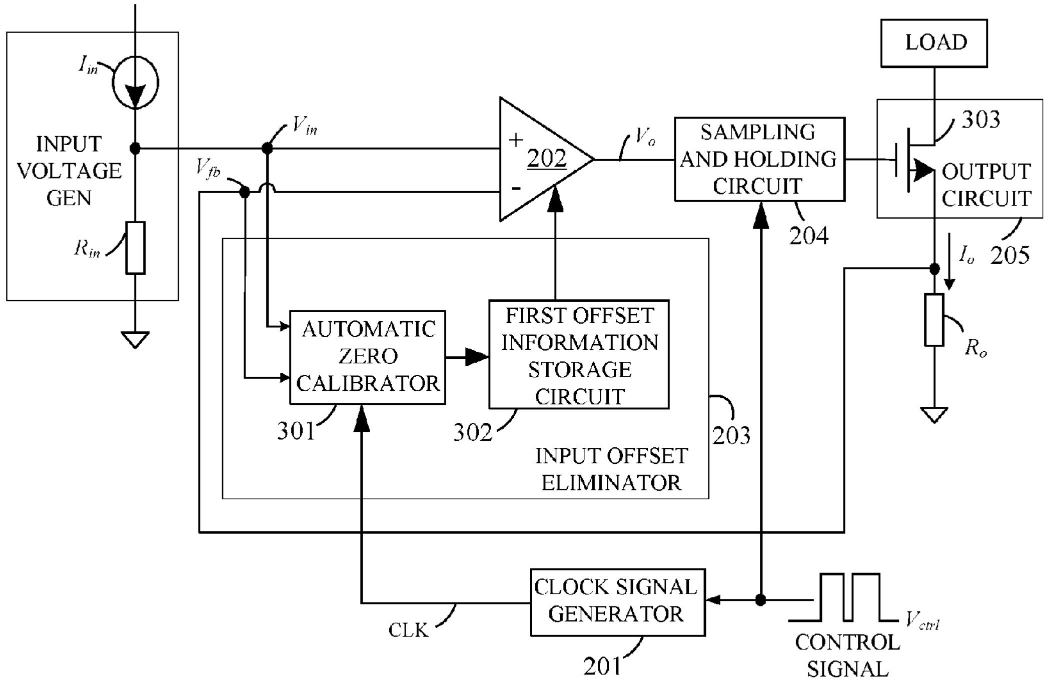
FIG. 3A shows a block diagram of a second example voltage controlled current source in accordance with embodiments of the present invention.

With reference to FIG. 3A, a block diagram of a second example voltage controlled current source in accordance embodiments of the present invention is shown. Here, an implementation of input offset cancellation circuit 203 and output circuit 205 are described in detail, and an input voltage generator is supplemented based on the example shown in FIG. 2.

The input voltage generator can include an input current source $I_{in}$ and an input resistor $R_{in}$ coupled in series to ground, and the voltage at the common node thereof can be supplied to a non-inverting terminal of first operational amplifier 202 as input voltage $V_{in}$. For example, the value of the input voltage may be equal to the product of input current source $I_{in}$ and input resistor $R_{in}$. Input offset cancellation circuit 203 can include an automatic zero calibrator 301 and a first offset information storage circuit 302.

Output circuit 205 can include power transistor 303, e.g., configured as a MOSFET transistor. A drain of power transistor 303 can be coupled to the load, and a source may be grounded through an output resistor $R_o$. A voltage at a common node of the power transistor source and output resistor $R_o$ may be configured as feedback voltage $V_{fb}$ coupled to an inverting terminal of first operational amplifier 202.

Figure 3B:
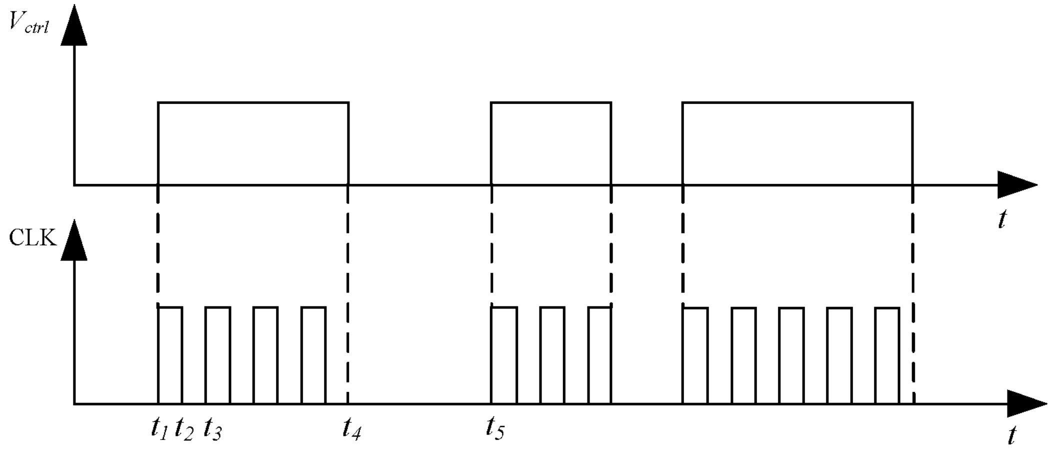
FIG. 3B shows operation waveforms of example operation of the voltage controlled current source shown in FIG. 3A.

Example operation (e.g., using high level enabling logic) of the voltage controlled current source shown in FIG. 3A will be described in conjunction with the waveform diagram of FIG. 3B. Referring now to time portion $t_1$-$t_4$ shown in FIG. 3B. At moment or time $t_1$, control signal $V_{ctrl}$ can be converted from a low level to a high level, and power transistor 303 may be fast driven by the stored energy of sampling and holding circuit 204 to supply power to the output load, through which fast response is achieved. Thus, there may be a conductive pathway between first operational amplifier 202 and sampling and holding circuit 204 during this time.

When feedback voltage $V_{fb}$ is less than input voltage $V_{in}$, the system is in a dynamic state, whereby a difference between $V_{fb}$ and $V_{in}$ can be amplified as output signal or voltage $V_o$ by first operational amplifier 202 to regulate output current $I_o$. Sampling and holding circuit 204 can receive output voltage $V_o$ to supply power to the output load, and may also store energy during this time with output signal or voltage $V_o$. When the system is in a steady state, the input offset may be substantially eliminated by automatic zero calibrator 301 and first offset information storage circuit 302.

Referring now to time portion $t_1$-$t_2$. From moment $t_1$ to moment $t_2$, control signal $V_{ctrl}$ and clock signal CLK may both be at a high level, and automatic zero calibrator 301 can receive input voltage and feedback voltage $V_{fb}$ to eliminate the input offset of first operational amplifier 202. Also, the input offset information may be stored by first offset information storage circuit 302.

Referring now to time portion $t_2$-$t_3$. From moment $t_2$ to moment $t_3$, control signal $V_{ctrl}$ may remain at a high level, while clock signal CLK can be converted to a low level. During this time portion, automatic zero calibrator 301 can be out of operation, the input offset may be eliminated by first operational amplifier 202 using the stored offset information of first offset information storage circuit 302. Thereafter, automatic zero calibrator 301 can shift in the above two states until control signal $V_{ctrl}$ is converted to a low level.

Referring now to time portion $t_4$-$t_5$. When control signal $V_{ctrl}$ is converted to a low level at $t_4$, power transistor 303 can be turned off rapidly by sampling and holding circuit 204. Thus, the power supply for the load maybe cut off. The conductive pathway may thus be broken between first operational amplifier 202 and sampling and holding circuit 204. From moment $t_4$ to moment $t_5$, both control signal $V_{ctrl}$ and clock signal CLK may be at a low level, and the stored energy may be maintained by sampling and holding circuit 204. In this way, the load can be driven relatively fast by output circuit 205 when control signal $V_{ctrl}$ recovers to a high level to achieve fast response. Also, automatic zero calibrator 301 may be out of operation during this time.

In accordance with the virtual short circuit property of an operational amplifier, we can conclude the formula (I) shown below.

$$I_{in} \times R_{in} = I_o \times R_o \quad (1)$$

Thus, for the example voltage controlled current source as shown in FIG. 3A, the control to the output current by the input voltage can be implemented by configuration of input resistor $R_{in}$ and output resistor $R_o$. The input offset can be substantially eliminated by automatic zero calibrator 301 to improve the output accuracy. Also, the problem of input offset not being eliminated due to a narrower pulse of the control signal can be solved through the sequence between control signal $V_{ctrl}$ and clock signal CLK. In addition, available types of power switches can be employed as output circuit 205.

Figure 4A:
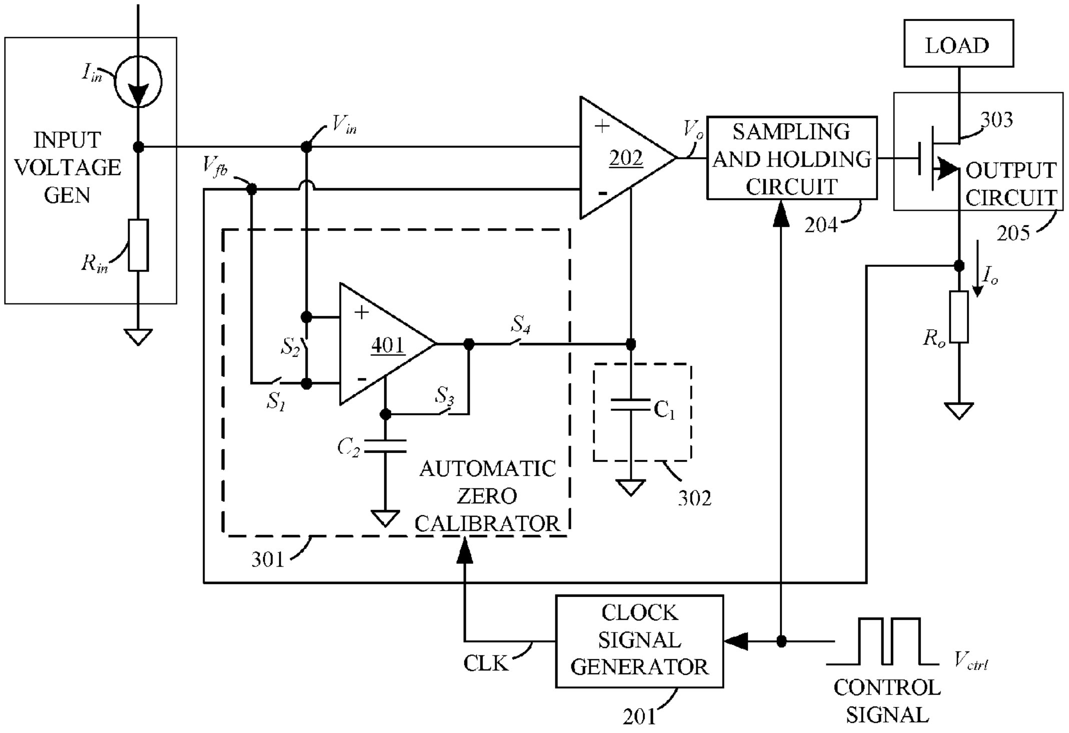
FIG. 4A shows a block diagram of a third example voltage controlled current source in accordance with embodiments of the present invention.

With reference to FIG. 4A, a block diagram of a third example voltage controlled current source in accordance with embodiments of the present invention is shown. Here, an implementation of automatic zero calibrator 301 and first offset information storage circuit 302 are described in detail. First offset information storage circuit 302 may be configured as a first capacitor $C_1$, one terminal of which can be coupled to first operational amplifier 202, and the other terminal of which may be coupled to ground.

Automatic zero calibrator 301 can include first switch $S_1$, second switch $S_2$, third switch $S_3$, fourth switch $S_4$, second operational amplifier 401, and second information storage circuit (e.g., second capacitor $C_2$). The non-inverting terminal of second operational amplifier 401 can be coupled to the non-inverting terminal of first operational amplifier 202, while the inverting terminal of second operational amplifier 401 may be coupled to the inverting terminal of the first operational amplifier 202 through first switch $S_1$.

The two terminals of second switch $S_2$ may be coupled to the non-inverting and inverting terminals of second operational amplifier 401. Second capacitor $C_2$ can be coupled between second operational amplifier 401 and ground. One terminal of third switch $S_3$ can be coupled to the common node of second capacitor $C_2$ and second operational amplifier 401, and the other terminal may be coupled to the output of second operational amplifier 401. One terminal of fourth switch $S_4$ can be coupled to the output of second operational amplifier 401, and the other terminal can be coupled to a common node of first capacitor $C_1$ and first operational amplifier 202.

Figure 4B:
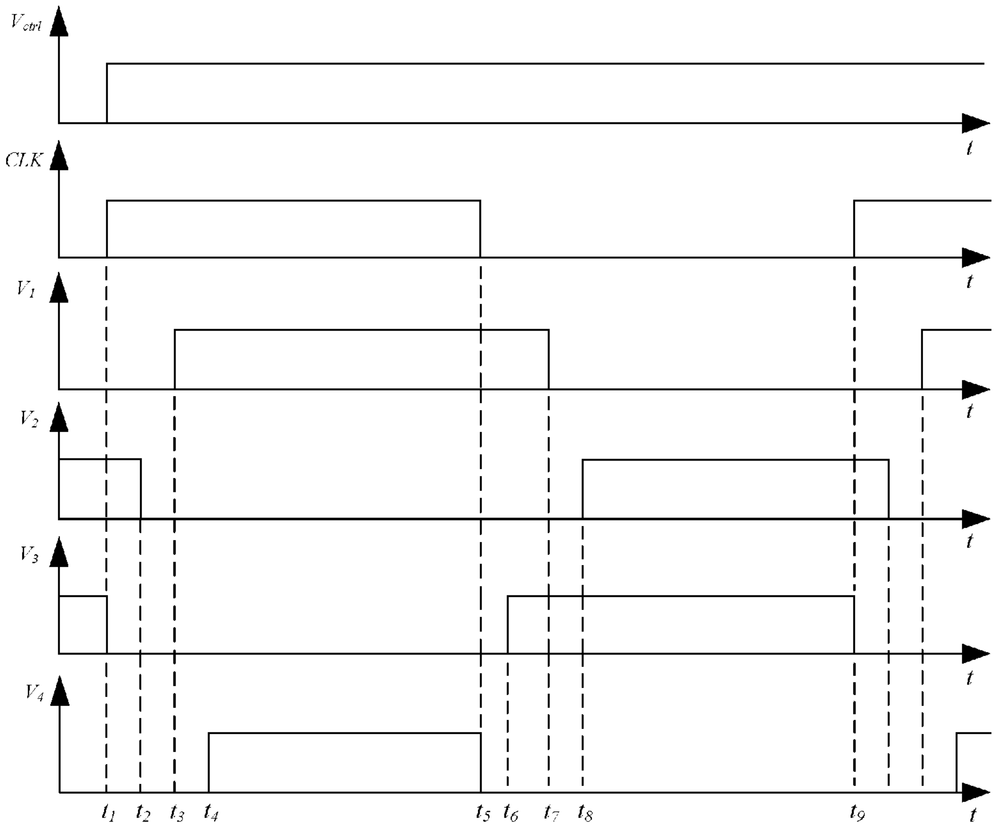
FIG. 4B shows operation waveforms of example operation of an automatic zero calibrator of the voltage controlled current source shown in FIG. 4A.

The operation state of automatic zero calibrator 301 can be controlled by controlling the switching state of first switch $S_1$, second switch $S_2$, third switch $S_3$ and fourth switch $S_4$. In a high level enabling logic example, the operation of automatic zero calibrator 301 of the voltage controlled current source as shown in FIG. 4A will be described in conjunction with example waveforms shown in FIG. 4B. Here, $V_1$, $V_2$, $V_3$, $V_4$ are representative of the control signals of first switch $S_1$, second switch $S_2$, third switch $S_3$ and fourth switch $S_4$ respectively.

Referring now to time portion $t_1$-$t_4$. At moment $t_1$, both of control signal $V_{ctrl}$ and clock signal CLK may be converted from a low level to a high level. During the portion from moment $t_1$ to moment $t_4$, the states of control signals $V_3$, $V_2$, $V_1$ and $V_4$ can be respectively alternated at moment $t_1$, $t_2$, $t_3$ and $t_4$ to control operation of the corresponding switches. At moment $t_4$, both of first switch $S_1$ and fourth switch $S_4$ may be turned on, and both of second switch $S_2$ and third switch $S_3$ can be turned off. The input offset of first operational amplifier 202 can be eliminated by automatic zero calibrator 301.

Referring now to time portion $t_4$-$t_5$. During the portion from moment $t_4$ to moment $t_5$, input voltage and feedback voltage $V_{fb}$ may be provided to second operational amplifier 401, and the input offset of first operational amplifier 202 can be amplified by second operational amplifier 401 and coupled to first operational amplifier 202 to eliminate the input offset by internal regulation. The input offset information may be stored by charging first capacitor $C_1$ with the output of second operational amplifier 401.

Referring now to time portion $t_5$-$t_8$. At moment $t_5$, clock signal CLK may be converted to a low level. The states of control signals $V_4$, $V_3$, $V_1$ and $V_2$ can be respectively alternated at moment $t_5$, $t_6$, $t_7$ and $t_8$ to control operation of the corresponding switches. At moment $t_8$, both of first switch $S_1$ and fourth switch $S_4$ may be turned off, and both of second switch $S_2$ and third switch $S_3$ can be turned on. Automatic zero calibrator 301 may begin to eliminate the offset of second operational amplifier 401.

Referring now to time portion $t_8$-$t_9$. During the portion from moment $t_8$ to moment $t_9$, automatic zero calibrator 301 may be out of operation or disabled. The input offset can be eliminated by first operational amplifier 202 in accordance with the input offset information stored in first capacitor $C_1$. The non-inverting terminal and the inverting terminal of second operational amplifier 401 may be shorted together. The input offset of second operational amplifier 401 can be amplified and then fed back to second operational amplifier 401 to eliminate the input offset. During this time, the input offset information of second operational amplifier 401 can be stored in second capacitor $C_2$ by the charge from the output of second operational amplifier 401. In this way, the input offset of second operational amplifier 401 may be maintained at substantially zero in accordance with input offset information of second capacitor $C_2$ when auto zero calibrator 301 begins to eliminate the input offset of first operational amplifier 202.

At moment $t_9$, clock signal CLK may again be converted to a high level, and the foregoing operation can be repeated until control signal $V_{ctrl}$ is converted to an low level. During the portion when control signal $V_{ctrl}$ is high, when clock signal CLK is high, the input offset of second operational amplifier 401 may be eliminated by automatic zero calibrator 301. When clock signal CLK is low, the input offset can be eliminated in accordance with the stored input offset information, and the input offset of second operational amplifier 401 may be eliminated, and also the input offset information of second operational amplifier 401 may be stored (e.g., prior to elimination).

It can be seen that the voltage controlled current source of the present invention (e.g., as shown in FIG. 4A) can eliminate the input offset and improve the output accuracy by operation of automatic zero calibrator 301 eliminating the input offset of first operational amplifier 202.

Figure 5:
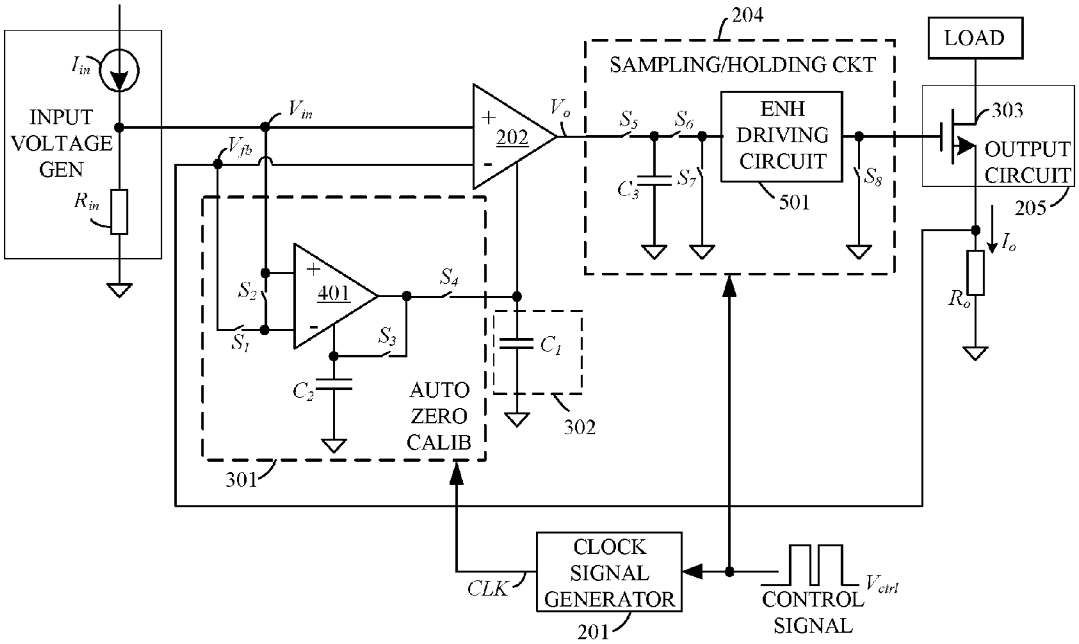
FIG. 5 shows a block diagram of a fourth example voltage controlled current source in accordance with embodiments of the present invention.

With reference to FIG. 5, a block diagram of a fourth example voltage controlled current source in accordance with embodiments of the present invention is shown. Here, an implementation of sampling and holding circuit 204 is described in detail. In this example, sampling and holding circuit 204 can include a first switch group of fifth switch $S_5$ and sixth switch $S_6$ (e.g., the switching operation of both being consistent with each other), a second switch group of seventh switch $S_7$ and eighth switch $S_8$ (e.g., the switching operation of both being consistent with each other), a third capacitor $C_3$, and an enhancing driving circuit 501.

Fifth switch $S_5$ and sixth switch $S_6$ may be connected in series between first operational amplifier 202 and enhancing driving circuit 501. The output of enhancing driving circuit 501 can be coupled to gate of power transistor 303 to accelerate its switching response speed. One terminal of third capacitor $C_3$ may be coupled to the common node of fifth switch $S_5$ and sixth switch $S_6$, and the other terminal of third capacitor $C_3$ may be coupled to ground. One terminal of seventh switch $S_7$ can be coupled to the common node of sixth switch $S_6$ and enhancing driving circuit 501, and the other terminal of seventh switch $S_7$ can be coupled to ground. One terminal of eighth switch $S_8$ can be coupled to the common node of enhancing driving circuit 501 and power transistor 303, and the other terminal of eighth switch $S_8$ can be coupled to ground.

In a particular high level enabling logic-based example, the operation of sampling and holding circuit 204 will be described. Here, $V_{5,6}$, $V_{7,8}$ are representative of the control signals of the first switch group and the second switch group, respectively. There may be a certain dead time between control signal $V_{5,6}$ and control signal $V_{7,8}$ to avoid "shoot-through" between the switches of the first switch group and the second switch group.

When control signal $V_{ctrl}$ is converted from a low level to a high level, the control signal $V_{7,8}$ can be converted from a high level to a low level substantially simultaneously to control the second switch group to be turned off. After a certain dead time, control signal $V_{5,6}$ may be converted from a low level to a high level to control the first switch group to be turned on. Third capacitor $C_3$ can be charged by output voltage $V_o$, and sampling and holding circuit 204 may be in a sampling state. Power transistor 303 can be driven fast by the storage energy of third capacitor $C_3$, and the voltage controlled current source may begin to supply power to the output load.

When control signal $V_{ctrl}$ is converted from a high level to a low level, control signal $V_{5,6}$ can be converted from a high level to a low level substantially simultaneously to control the first switch group to be turned off. After a certain dead time, control signal $V_{7,8}$ may be converted from a low level to add high level to control the second switch group to be turned on, and power transistor 303 is turned off. When the first switch group is off and the second switch group is on, sampling and holding circuit 202 may be in a holding status to maintain the stored energy information of third capacitor $C_3$ to ensure that power transistor 303 can be driven fast when control signal $V_{ctrl}$ recovers to high level.

It can be concluded that the input offset can be eliminated to improve the output accuracy and the switching speed to achieve a relatively fast response by storing the energy sufficient to drive power switch 303 after being turned off. For the above-mentioned examples, power transistor 303 can be implemented as a MOSFET transistor, and the control for the on/off conditions of power transistor 303 may be implemented by the charge/discharge of the intrinsic capacitor between the source and the gate. However, because the switching speed may be influenced by a larger intrinsic capacitor $C_{gs}$ for a high power MOSFET transistor, enhancing driving circuit 501 may be employed.

Figure 6:
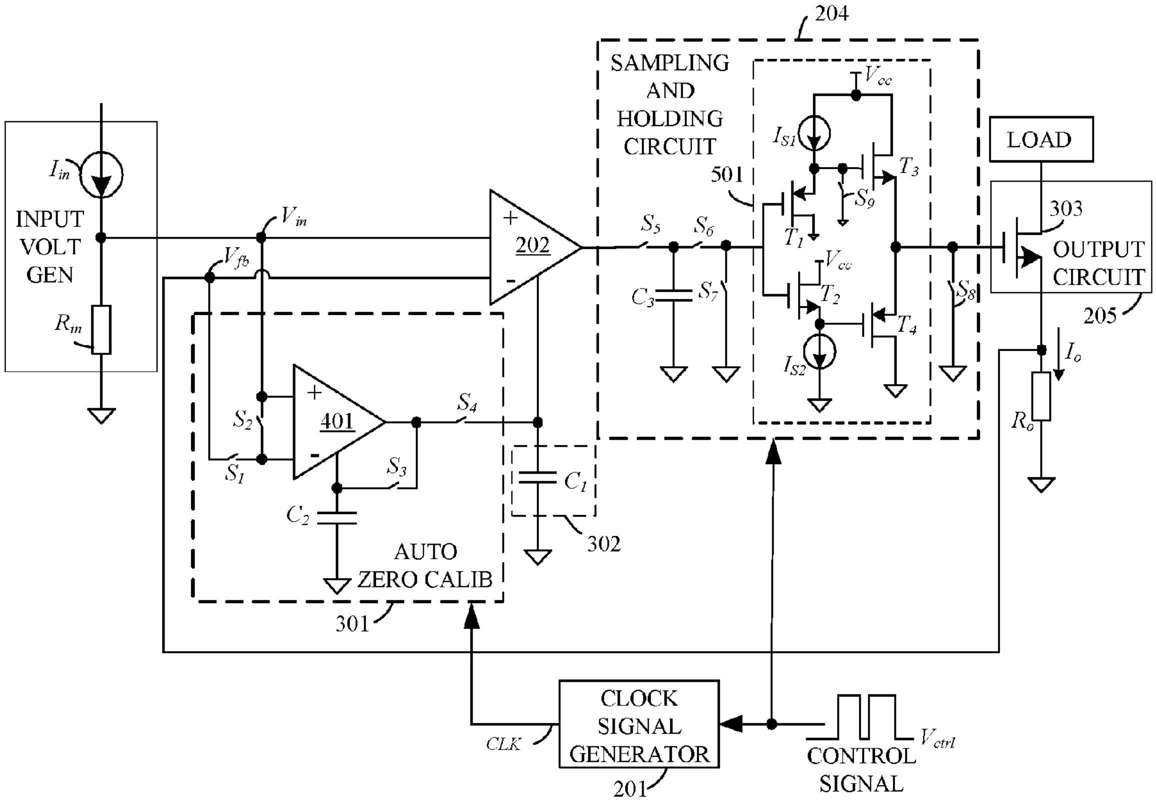
FIG. 6 shows a block diagram of a fifth example voltage controlled current source in accordance with embodiments of the present invention.

With reference to FIG. 6, a block diagram of a fifth example voltage controlled current source in accordance with embodiments of the present invention is shown. Here, an implementation of enhancing driving circuit 501 is described in detail. Enhancing driving circuit 501 can include a source follower form by first power transistor $T_1$ and second power transistor $T_2$, a push-pull circuit formed by third power transistor $T_3$ and fourth power transistor $T_4$, and ninth switch $S_9$.

Current source $I_{s1}$ and first power transistor $T_1$ may be connected in series between input voltage source $V_{cc}$ and ground, a common node of which can be coupled to the gate of third power transistor $T_3$. Current source $I_{s2}$ and second power transistor $T_2$ can be connected in series between input voltage source $V_{cc}$ and ground, the common node of which may be coupled to the gate of fourth power transistor $T_4$. Both the gates of first power transistor $T_1$ and second power transistor $T_2$ can also be coupled together to the first switch group. Third power transistor $T_3$ and fourth power transistor $T_4$ can be connected in series between input voltage source $V_{cc}$ and ground, the common node of which may be coupled to the gate of power transistor 303. Ninth switch $S_9$ can be coupled between ground and the common node of first power transistor $T_1$, current source $I_{S1}$, and the gate of the third power transistor $T_3$. The switching operation of ninth switch $S_9$ may also be consistent with the second switch group.

When control signal $V_{ctrl}$ is converted to a high level, the first switch group may be turned on, and after a certain dead time, both of ninth switch $S_9$ and the second switch group can be turned off and third power switch $T_3$ may be turned on. The voltage and current at the gate of power switch 303 can be increased by the source follower to accelerate the charge for intrinsic capacitor $C_{gs}$ to achieve rapid drive for power switch 303.

When control signal $V_{ctrl}$ is converted to a low level, both of ninth switch $S_9$ and the second switch group may be turned on, and after a certain dead time, both of the first switch group and third power switch $T_3$ can be turned off, and there may thus be no current flowing through power switch 303. The discharge of intrinsic capacitor $C_{gs}$ can be accelerated through fourth power switch $T_4$ and the on resistance of eighth switch $S_8$ to turn off power switch 303 in a relatively fast fashion.

An example controlling method of the various voltage controlled current source examples described herein and in accordance with the embodiments of the present invention will be described below. In one embodiment, a controlling method for a voltage controlled current source configured to drive an output load in accordance with an input voltage, can include: (i) receiving a square-waveform control signal; (ii) generating a clock signal based on the control signal, where the clock signal includes a square waveform signal with a predetermined duty cycle during an active portion of the control signal, and where the clock signal is in an inactive state during an inactive portion of the control signal; (iii) when the clock signal is active, storing input offset information and eliminating an input offset of a first operational amplifier by using the input voltage and a feedback voltage of the output load, and generating an error signal according to an error between the input and feedback voltages; (iv) when the clock time is inactive, generating the error signal according to the error between the input and feedback voltages, and storing the input offset information; (v) storing energy in accordance an output signal of the first operational amplifier during the active portion of the control signal; (vi) maintaining the stored energy during the inactive portion of the control signal; (vii) driving the output load in accordance with the stored energy at an initial active moment of the control signal; and (viii) driving the output load in accordance with the output signal during the active portion of the control signal.

Figure 7:
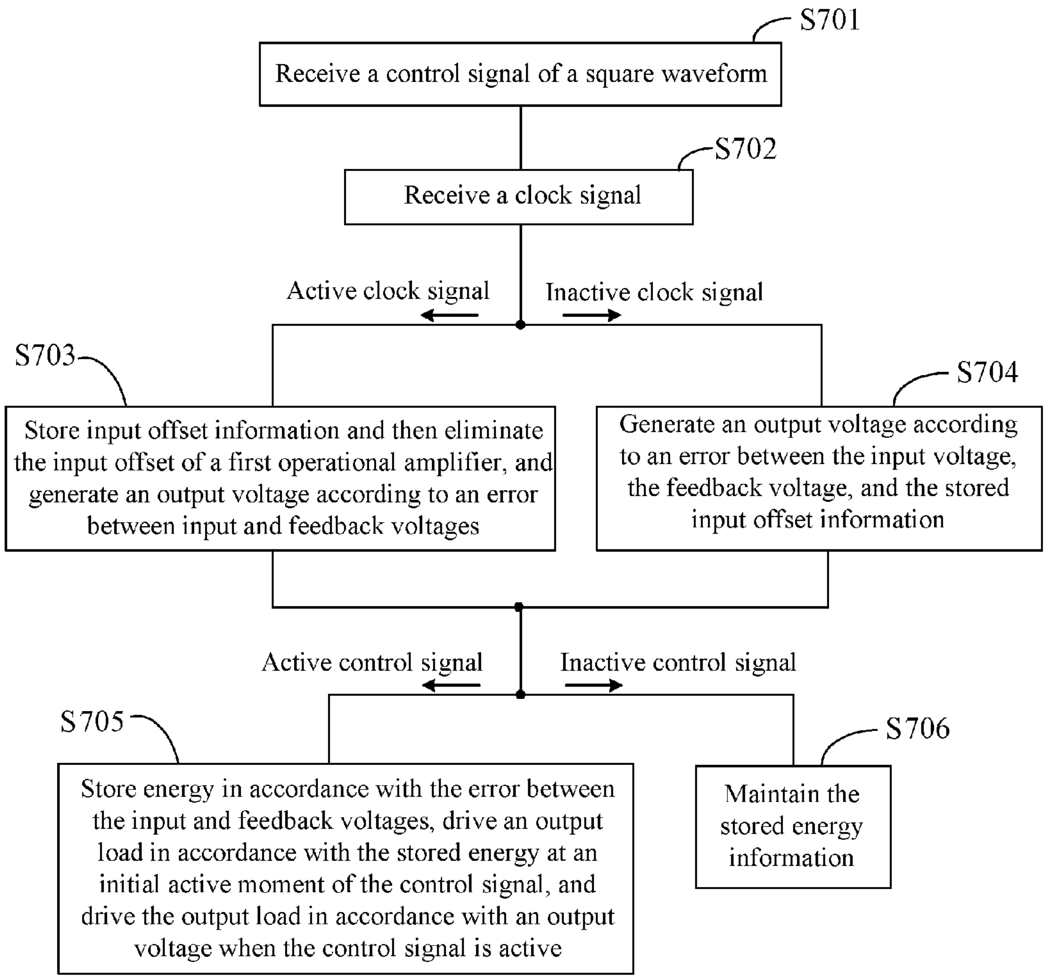
FIG. 7 shows a flowchart of an example controlling method for a voltage controlled current source in accordance with embodiments of the present invention.

Referring now to FIG. 7, a flowchart of an example controlling method of the voltage controlled current source in accordance with embodiments of the present invention is shown. At S701, a control signal of a square waveform can be received. At S702, a clock signal can be received. For example, the clock signal may represent a square waveform, and may be generated during an active portion of the control signal. Also, the clock signal may be maintained inactive during the inactive portion of the control signal.

At S703, when the clock signal is active (e.g., during a first time interval), the input voltage and the feedback voltage of the output load may be utilized to eliminate the input offset of the first operational amplifier. Also, (e.g., prior to elimination), the input offset information may be stored as discussed above. An output signal may be generated according to the error between the input voltage and the feedback voltage of the output load.

At S704 when the clock signal is inactive (e.g., during the second time interval), the output signal (e.g., a voltage) can be generated according to the error between the input voltage, the feedback voltage, and the stored input offset information. At S705, energy may be stored in accordance with the error between the input voltage and the feedback voltage during the active portion of the control signal. At S706 the stored energy information can be maintain during an inactive portion of the control signal.

The output load can be driven in accordance with the stored energy at substantially the initial active moment of the control signal. Here, the duty cycle of the control signal is variable and the duty cycle of the clock signal is fixed. The step of S703 may also include a second operational amplifier for receiving the input voltage and the feedback voltage of the output load to eliminate the input offset of the first operational amplifier during the first time interval. The step of S704 may also include the second operational amplifier eliminating its input offset and storing its offset information during the second time interval. The controlling method of the voltage controlled current source shown in FIG. 7 may also include enhancement for the output voltage of the first operational amplifier, as discussed above.

In one embodiment, a power supply can include: (i) the voltage controlled current source; (ii) a power stage circuit configured to receive an input signal and a pulse-width modulation (PWM) control signal, and to generate an output voltage coupled to the voltage controlled current source; and (iii) a controlling circuit configured to generate the PWM control signal in accordance with the feedback signal of the output load. The voltage controlled current source can receive the PWM control signal, eliminate the input offset and generate an output current according to the input voltage and the feedback signal of the output load to drive the output load.

Figure 8:
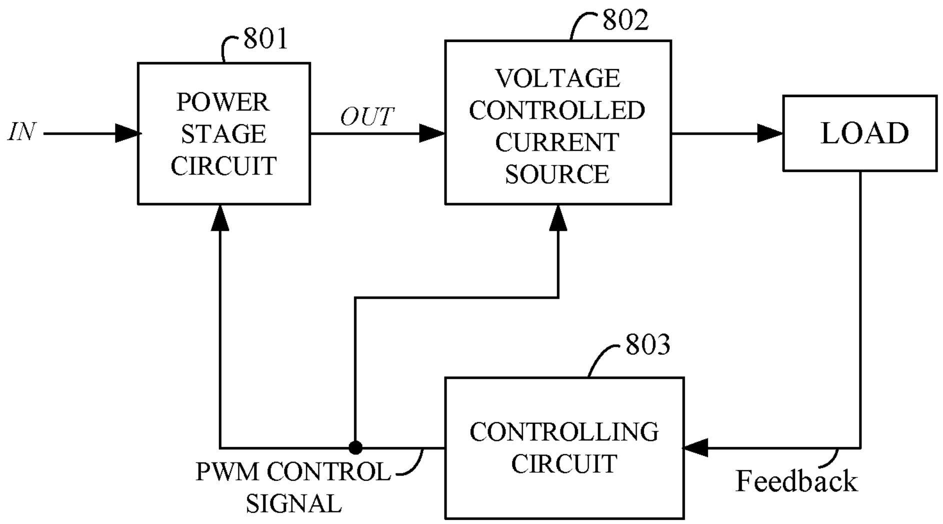
FIG. 8 shows a block diagram of an example power supply in accordance with embodiments of the present invention.

FIG. 8 shows a block diagram of an example power supply in accordance with embodiments of the present invention. The power stage circuit 801 can receive an input signal IN and the PWM control signal to generate an output voltage OUT to effectively supply an input voltage to voltage controlled current source 802. For example, voltage controlled current source 802 may be any of the examples discussed above.

The controlling circuit 803 may be configured to generate the PWM control signal in accordance with the feedback signal of the output load, and the PWM control signal may be coupled to the voltage controlled current source 802. The voltage controlled current source 802 may utilize the PWM control signal to eliminate its input offset and generate an output current according to the input voltage and the feedback signal of the output load, to drive the output load.

The foregoing descriptions of specific embodiments of the present invention have been presented through images and text for purpose of illustration and description of the voltage controlled current source circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A voltage controlled current source configured to drive an output load based on an input voltage, the voltage controlled current source comprising:

a) a clock signal generator configured to generate a clock signal based on a square-waveform control signal, wherein said clock signal comprises a square waveform signal with a predetermined duty cycle during an active portion of said control signal, and wherein said clock signal is in an inactive state during an inactive portion of said control signal;

b) a first operational amplifier having a first terminal configured to receive said input voltage, and a second terminal configured to receive a feedback voltage of said output load;

c) an input offset eliminator configured to receive said clock signal, said input voltage, and said feedback voltage, wherein said input offset eliminator is configured to (i) store and then eliminate an input offset of said first operation amplifier, and to generate an error signal in accordance with an error between said input and feedback voltages when said clock signal is active and to (ii) generate said error signal in accordance with said stored input offset and said error between said input and feedback voltages when said clock signal is inactive;

d) a sampling and holding circuit configured to receive an output signal of said first operational amplifier and said control signal, wherein energy is stored in accordance with said output signal of said first operational amplifier during said active portion of said control signal, and wherein said stored energy is maintained by said sampling and holding circuit during said inactive portion of said control signal; and e) an output circuit coupled to said sampling and holding circuit, said output circuit being configured to drive said output load during said active portion of said control signal.

2. The voltage controlled current source of claim 1, wherein a duty cycle of said control signal is variable, and a duty cycle of said clock signal is fixed.

3. The voltage controlled current source of claim 1, wherein said input offset eliminator comprises an automatic zero calibrator and a first offset information storage circuit.

4. The voltage controlled current source of claim 3, wherein said automatic zero calibrator comprises a first switch, a second switch, a third switch, a fourth switch, a second operational amplifier, and a second input offset information storage circuit, wherein:

a) said first switch is coupled between an inverting input terminal of said first operational amplifier and an inverting input terminal of said second operational amplifier;

b) said second switch is coupled between said non-inverting input terminal of said first operational amplifier and said inverting input terminal of said second operational amplifier;

c) said third switch is coupled between an output of said second operational amplifier and said second input offset information storage circuit;

d) said fourth switch is coupled between said output of said second operational amplifier and said first input offset information storage circuit;

e) when said clock signal is active, said first switch and said fourth switch are on, and said second switch and said third switch are off, and said input offset of said first operational amplifier is eliminated by said automatic zero calibrator; and f) when said clock signal is inactive, said first switch and said fourth switch are off, and said second switch and said third switch are on, and said input offset of said second operational amplifier is eliminated by said automatic zero calibrator.

5. The voltage controlled current source of claim 4, wherein said first input offset information storage circuit comprises a first capacitor coupled between said first operational amplifier and ground, and wherein said second input offset information storage circuit comprises a second capacitor coupled between said second operational amplifier and ground.

6. The voltage controlled current source of claim 1, wherein said sampling and holding circuit comprises a first switch group, a second switch group, a third capacitor, and an enhancing driving circuit, wherein:

a) said first switch group comprises a fifth switch and a sixth switch coupled in series between said output of said first operational amplifier and said enhancing driving circuit;

b) said enhancing driving circuit is coupled to said output circuit to enhance a response speed;

c) said third capacitor is coupled between ground and a common node of said fifth and sixth switches; and d) said second switch group comprises a seventh switch and an eighth switch, said seventh switch being coupled between ground and a common node of said sixth switch and said enhancing driving circuit, said eighth switch being coupled between said enhancing driving circuit and ground.

7. The voltage controlled current source of claim 6, wherein there is a dead time between switching sequences of said first switch group and said second switch group.

8. The voltage controlled current source of claim 7, wherein said enhancing driving circuit further comprises a source follower having a first power switch and a second power switch, a push-pull circuit having a third power switch and a fourth power switch, and a ninth switch.

9. The voltage controlled current source of claim 1, wherein said output circuit comprises a power switch which coupled between said output load and ground through an output resistor, and wherein a voltage at a common node of said power switch and said output resistor is configured as said feedback voltage of said output load.

10. The voltage controlled current source of claim 1, further comprising an input voltage generator having an input current source and an input resistor coupled in series to ground, wherein a voltage at a common node of said input current source and said input resistor is configured as said input voltage.

11. A power supply, comprising:

a) said voltage controlled current source of claim 1;

b) a power stage circuit configured to receive an input signal and a pulse-width modulation (PWM) control signal, and to generate an output voltage coupled to said voltage controlled current source; and c) a controlling circuit configured to generate said PWM control signal in accordance with said feedback signal of said output load, d) wherein said voltage controlled current source is configured to receive said PWM control signal, to eliminate said input offset and to generate an output current according to said input voltage and said feedback signal of said output load to drive said output load.

12. A controlling method for a voltage controlled current source configured to drive an output load in accordance with an input voltage, the method comprising:

a) receiving a square-waveform control signal;

b) generating a clock signal based on said control signal, wherein said clock signal comprises a square waveform signal with a predetermined duty cycle during an active portion of said control signal, and wherein said clock signal is in an inactive state during an inactive portion of said control signal;

c) when said clock signal is active, storing input offset information and eliminating an input offset of a first operational amplifier by using said input voltage and a feedback voltage of said output load, and generating an error signal according to an error between said input and feedback voltages;

d) when said clock time is inactive, generating said error signal according to said error between said input and feedback voltages, and storing said input offset information;

e) storing energy in accordance an output signal of said first operational amplifier during said active portion of said control signal;

f) maintaining said stored energy during said inactive portion of said control signal;

g) driving said output load in accordance with said stored energy at an initial active moment of said control signal; and h) driving said output load in accordance with said output signal during said active portion of said control signal.

13. The method of claim 12, wherein a duty cycle of said control signal is variable, and a duty cycle of said clock signal is fixed.

14. The method of claim 12, further comprising:

a) eliminating, when said clock signal is active, said input offset of said first operational amplifier by using a second operational amplifier in accordance with said input voltage and said feedback voltage of said output load; and b) storing and then eliminating said input offset of said first operational amplifier when said clock signal is inactive.

15. The method of claim 12, further comprising enhancing said output signal of said first operational amplifier.

* * * * *